United States Patent
Zhong et al.

(10) Patent No.: US 7,053,021 B1
(45) Date of Patent: May 30, 2006

(54) CORE-SHELL SYNTHESIS OF CARBON-SUPPORTED ALLOY NANOPARTICLE CATALYSTS

(75) Inventors: Chuan-Jian Zhong, Johnson City, NY (US); Jin Luo, Vestal, NY (US); Mathew M. Maye, Vestal, NY (US); Li Han, Binghamton, NY (US); Nancy N. Kariuki, Binghamton, NY (US); Ting He, Dublin, OH (US)

(73) Assignee: The Research Foundation of the State University of New York, Binghamton, NY (US)

(*) Notice: Subject to any disclaimer, the term of this patent is extended or adjusted under 35 U.S.C. 154(b) by 0 days.

(21) Appl. No.: 10/830,986

(22) Filed: Apr. 22, 2004

(51) Int. Cl.
*B01J 21/18* (2006.01)
*B01J 23/74* (2006.01)
*B01J 23/40* (2006.01)
*B22F 1/00* (2006.01)
*B22F 9/00* (2006.01)

(52) U.S. Cl. ............. 502/185; 502/326; 502/353; 75/343; 75/362

(58) Field of Classification Search ........... 502/185, 502/326, 353; 75/343, 362
See application file for complete search history.

(56) References Cited

U.S. PATENT DOCUMENTS 5,876,867 A * 3/1999 Itoh et al. .............. 429/44
6,254,662 B1 * 7/2001 Murray et al. ............ 75/348
6,972,046 B1 * 12/2005 Sun et al. ................. 75/348
2002/0034675 A1 * 3/2002 Starz et al. ............... 429/42
2004/0055419 A1 * 3/2004 Kurihara et al. .......... 75/362
2004/0167257 A1 * 8/2004 Ryang ...................... 524/262

OTHER PUBLICATIONS

S.H. Sun et al., "Monodisperse FePt Nanoparticles and Ferromagnetic FePt Nanocrystal Superlattices", Science, 2000, vol. 287, pp. 1989-1992, no month.
Michael J. Hostetler et al., "Stable, Monolayer-Protected Metal Alloy Clusters", J. Am. Chem. Soc.1998, 120, pp. 9396-9397, no month.
M.M. Maye et al., "Heating-Induced Evolution of Thiloate-Encapsulated Gold Nanoparticles: A Strategy for Size and Shape Manipulations," Langmuir, 2000, 16, pp. 490-497, no month.

(Continued)

*Primary Examiner*—J. A. Lorengo
*Assistant Examiner*—Patricia L. Hailey
(74) *Attorney, Agent, or Firm*—Mark Levy & Associates, PLLC; David L. Banner

(57) ABSTRACT

There is provided a method of preparing carbon supported, ternary alloy composition core-shell PtVFe nanoparticles for use as fuel cell electrocatalysts. These catalysts have been found particularly useful for oxygen reduction reactions. The alloy nanoparticles can be assembled on carbon supports which then may undergo subsequent activation and/or calcination treatments. The method, combined with new synthetic feed and processing conditions, provides core-shell PtVFe alloy nanoparticles of 1–3 nm size. The catalyst-produced high monodispersity, controlled composition are highly dispersed, and have a uniform distribution. Finally, the correlation of the preparation and treatment parameters to the ORR catalytic activities of the prepared nanoparticles is described. The catalysts exhibit ORR in the range of 2 to 4 times more than a standard Pt/carbon catalyst.

34 Claims, 13 Drawing Sheets

OTHER PUBLICATIONS

M.M. Maye et al., "Manipulating Core-Shell Reactivites for Processing Nanoparticle Sizes and Shapes," J. Mater. Chem., 2000, 10, pp. 1895-1901, no month.

C.J. Zhong et al., "Core-Shell Assembled Nanoparticles as Catalysts," Adv. Mater., 2001, 13, No. 19, pp. 1507-1511, no month.

C.J. Zhong et al., "Size and Shape Evolution of Core-Shell Nanocrystals", Chem. Commun., 1999, pp. 1211-1212, no month.

Jin Luo et al., "Thermal Activation of Molecularly-Wired Gold Nanoparticles on a Substrate as Catalyst", J. Am. Chem. Soc. 2002, 124, pp. 13988-13989, no month.

M. Brust et al., "Synthesis of Thiol-Derivertized Gold Nanoparticles in a Two-Phase Liquid-Liquid System", J. Chem. Soc., Chem. Commun. 1994, 801, no month.

Zhong et al., "Size and Shape Evolutions for Thiolate-Encapsulated Gold Nanocrystals", Chem. Commun., 1999, 13, 1211, no month.

* cited by examiner

CORE-SHELL SYNTHESIS OF CARBON-SUPPORTED ALLOY NANOPARTICLE CATALYSTS

FIELD OF THE INVENTION

The present invention pertains to synthesizing alloy nanoparticles and, more particularly, to synthesizing carbon-supported alloy core-shell nanoparticle which may be used as electrocatalysts for fuel cells.

BACKGROUND OF THE INVENTION

Fuel cells operate by electrochemical oxidation of hydrogen or hydrocarbon fuels at an anode and the reduction of oxygen at a cathode. Fuel cells are attractive power sources due to their high conversion efficiencies, little or no pollution, light weight, and high power density. Extensive studies have been focused on using platinum-group (Pt-group) metals as materials for both anode and cathode catalysts. However, due to the sluggish reaction kinetics, particularly at the cathode, the efficiency and fuel economy of fuel cells using these catalysts have been limited. Moreover, because of the generally high cost of Pt-group metals, their use in fuel cells has also been limited. It has been necessary to either replace them with cheaper catalysts or to reduce the amount of Pt-group metals used.

Though nanoparticle platinum-group catalysts are well known, practical methods for the preparing platinum-based alloy nanoparticles, (e.g. in the 2–3 nm size range) have heretofore not been available. Such nanoparticles can solve some of the problems of the prior art by increasing the intrinsic kinetic activity of catalysts formed therefrom. Furthermore, as the size of the particles is reduced, the ration of surface area to volume increases. This ratio increase results in a higher utilization of the catalysts. However, it is a major challenge to synthesize and process alloy nanoparticles of such a small size (e.g., approximately 2 nm) with high monodispersity and controlled composition. Most existing approaches to producing such nanoparticles involve deposition and co-precipitation. These prior art processes, unfortunately, can not produce alloy nanoparticles of such a small size range (e.g., 2 nm) with the high monodispersity and controlled phase and composition required for efficient fuel cell catalysts. In addition, when the nanoparticles prepared using such prior methods are supported on carbon, the particles have not been highly dispersed or very uniform.

The preparation methods of the present invention, however, overcome the disadvantages of the preparation methods of the prior art. The inventive approaches are based on the use of core-shell gold and gold-based alloy nanoparticles as described in technical papers, references: S. H. Sun, C. B. Murray, D. Weller, L. Folks, A. Moser, "Monodisperse FePt nanoparticles and ferromagnetic FePt nanocrystal superlattices", Science, 2000, 287, 1989; M. Brust, M. Walker, D. Bethell, D. J. Schiffrin, R. Whyman, "Synthesis of Thiol-Derivertized Gold Nanoparticles in a Two-Phase Liquid—Liquid System", J. Chem. Soc., Chem. Comm. 1994, 801; Zhong, C. J.; Zheng, W. X.; Leibowitz, F. L.; Eichelberger, H. H., "Size and Shape Evolutions for Thiolate-Encapsulated Gold Nanocrystals", Chem. Commun., 1999, 13, 1211; M. M. Maye, W. X. Zheng, F. L. Leibowitz, N. K. Ly, C. J. Zhong, "Heating-Induced Evolution of Thiolate-Encapsulated Gold Nanoparticles: A Strategy for Size and Shape Manipulations", Langmuir, 2000, 16, 490; M. M. Maye, C. J. Zhong, "Manipulating core-shell reactivities for processing nanoparticle sizes and shapes", J. Mater. Chem., 2000, 10, 1895; C. J. Zhong, M. M. Maye, "Core-Shell Assembled Nanoparticles as Catalysts", Adv. Mater., 2001, 13, 1507.

SUMMARY OF THE INVENTION

In accordance with the present invention, there is provided a method of preparing either carbon supported or no-supported ternary alloy composition core-shell nanoparticles, suitable for use as fuel cell electrocatalysts. These catalysts have been found particularly useful for oxygen reduction reactions (ORR). The inventive method uses one-phase reduction or reduction-decomposition methods of fabricating targeted nanoparticles with core-shell morphology. The core-shell Platinum-Vanadium-Iron (PtVFe) nanoparticles are defined as smaller-sized PtVFe nanocrystal cores (approximately 2 nm diameter) capped with organic monolayer shells. The organic monolayer shells consist of organic alkyl chains with amine and/or carboxylic acid functional groups. Examples include oleyl amine (OAM) and oleic acid (OAC). The alloy nanoparticles can be assembled on carbon supports which then may undergo subsequent activation and/or calcination treatments. A method combined with new synthetic feed, and processing conditions of preparing core-shell PtVFe alloy nanoparticles in the range of approximately 1–10 nm diameter, and more preferably, in the range of between approximately 1 and 3 nm diameter are disclosed. The catalysts produced in accordance with the methods of the present invention exhibit high monodispersity, controlled composition, are highly dispersed, and have a uniform distribution. Specifically, the present invention describes the synthesis of PtVFe nanoparticles using different synthetic feed ratios and correlates the nanoparticle composition to the feed composition. In addition, techniques are provided for assembling the nanoparticles on carbon supports under different mixing/stirring conditions. The correlation between size and loading is also described. Thermal treatment of the carbon-loaded nanoparticles, and the correlation of shell removal and calcination with temperature and heating environment are shown. Finally, the correlation of the preparation and treatment parameters to the ORR catalytic activities of the prepared nanoparticles is described.

It is therefore an object of the invention to provide a method of preparing core-shell ternary Pt, V, and Fe nanoparticle catalysts.

It is another object of the invention to provide a method of preparing core-shell PtVFe nanoparticles having controllable compositions by controlling the synthetic feed ratios.

It is further object of the invention to provide a method of preparing core-shell PtVFe nanoparticles whose size may be controlled to approximately 2 nm.

It is an additional object of the invention to provide a method of preparing core-shell PtVFe nanoparticles whose size may be controlled and which exhibit a high size monodispersity.

It is yet another object of the invention to provide a method of preparing core-shell PtVFe nanoparticles that may be assembled on carbon materials yielding assemblies having controllable size, composition, loading, and distribution.

It is a still further object of the invention to provide a method of preparing core-shell PtVFe nanoparticles that may be effectively activated by thermal treatments at temperatures in the range of approximately 300–600° C.

It is a still another object of the invention to provide a method of preparing core-shell PtVFe nanoparticles that, when activated, exhibits controllable sizes and compositions under a number of well-defined conditions.

It is an additional object of the invention to provide a method of preparing core-shell PtVFe nanoparticles that exhibit ORR catalytic mass activities that are in the range of approximately 2–4 times the ORR catalytic mass activity of pure Pt/C nanoparticle catalysts.

BRIEF DESCRIPTION OF THE DRAWINGS

A complete understanding of the present invention may be obtained by reference to the accompanying drawings, when considered in conjunction with the detailed description, in which:

FIG. 1b is an enlarged view of a portion of the surface of the PtVFe nanoparticle of FIG. 1a;

FIG. 5b is a histogram of size distribution of a sample of the nanoparticles of FIG. 5a;

FIG. 9b is a histogram of a particle size distribution for the nanoparticles of FIG. 9a;

DETAILED DESCRIPTION OF THE PREFERRED EMBODIMENT

Synthesis of Core-Shell PtVFe Nanoparticles The synthesis and processing of core-shell PtVFe nanoparticles of the present invention are based on prior work as described in the references provided hereinabove, expanding upon the synthesis and processing methods for core-shell gold and gold-alloy nanoparticles and catalysts described therein. The novel core-shell preparative approach of the present invention, however, differs significantly from all prior art preparation methods and techniques such as deposition/co-precipitation approaches for the preparation of PtVFe nanoparticle catalysts.

Figure 1B:
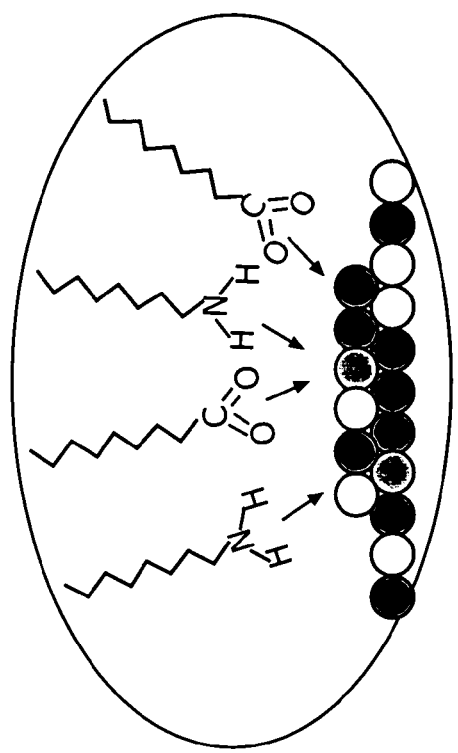
Figure 1A:
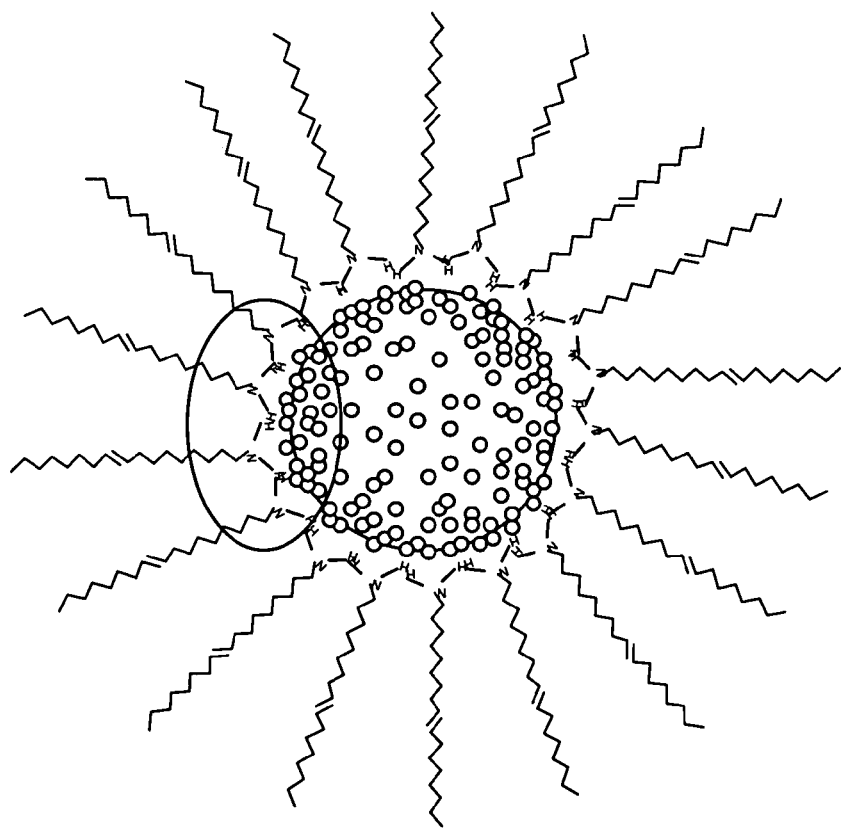
FIG. 1a is pictorial schematic representation of a single PtVFe nanoparticle produced in accordance with the method of the invention.

Referring first to FIGS. 1a and 1b, there are shown schematic pictorial representations of a core-shell PtVFe nanoparticle prepared in accordance with the present invention. FIG. 1a shows an overall view of a single nanoparticle while FIG. 1b shows an enlargement of a portion of the surface of the nanoparticle of FIG. 1a. FIG. 1a shows a ternary nanocrystal core capped a monolayer organic shell.

FIG. 1b illustrates the interfacial interactions likely involved between the functional groups of the capping layer and the surface metals of the nanocrystal core.

Figure 2:
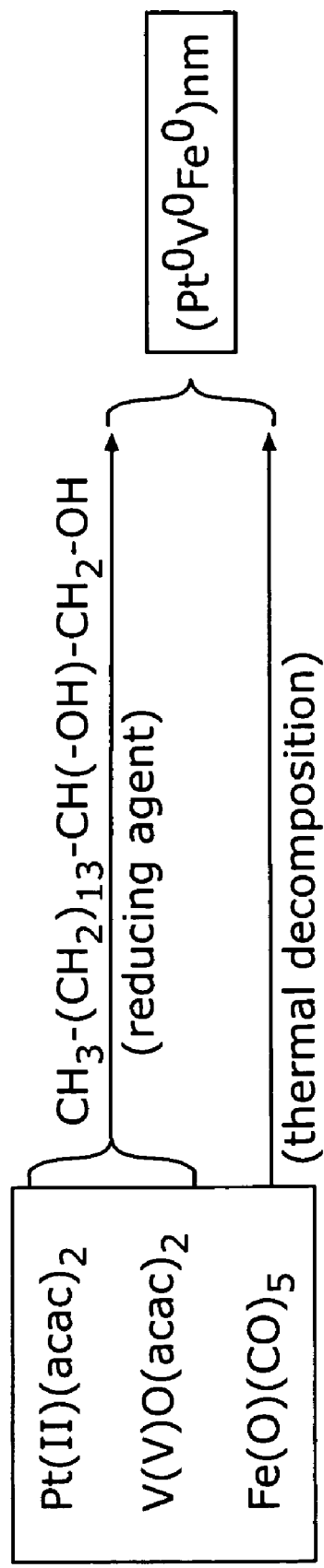
FIG. 2 a schematic representation of a general reaction for the synthesis of the core-shell nanoparticles.

Referring now to FIG. 2, there is shown a schematic representation of a general reaction for the synthesis of the core-shell nanoparticles such as the particle of FIGS. 1a and 1b. The precursors such as platinum acetylacetonate (Pt(acac)) and vanadyl acetylacetonate (V(acac)) are reduced in the presence of a reducing agent (1,2-hexadecanediol) and capping materials (OMA and OAC) in octyl ether solvent, whereas iron pentacarbonyl ($Fe(CO)_5$) is thermally decomposed, resulting in Platinum-Vanadium-Iron ($Pt^0V^0Fe^0$) nanoparticles.

Figure 3:
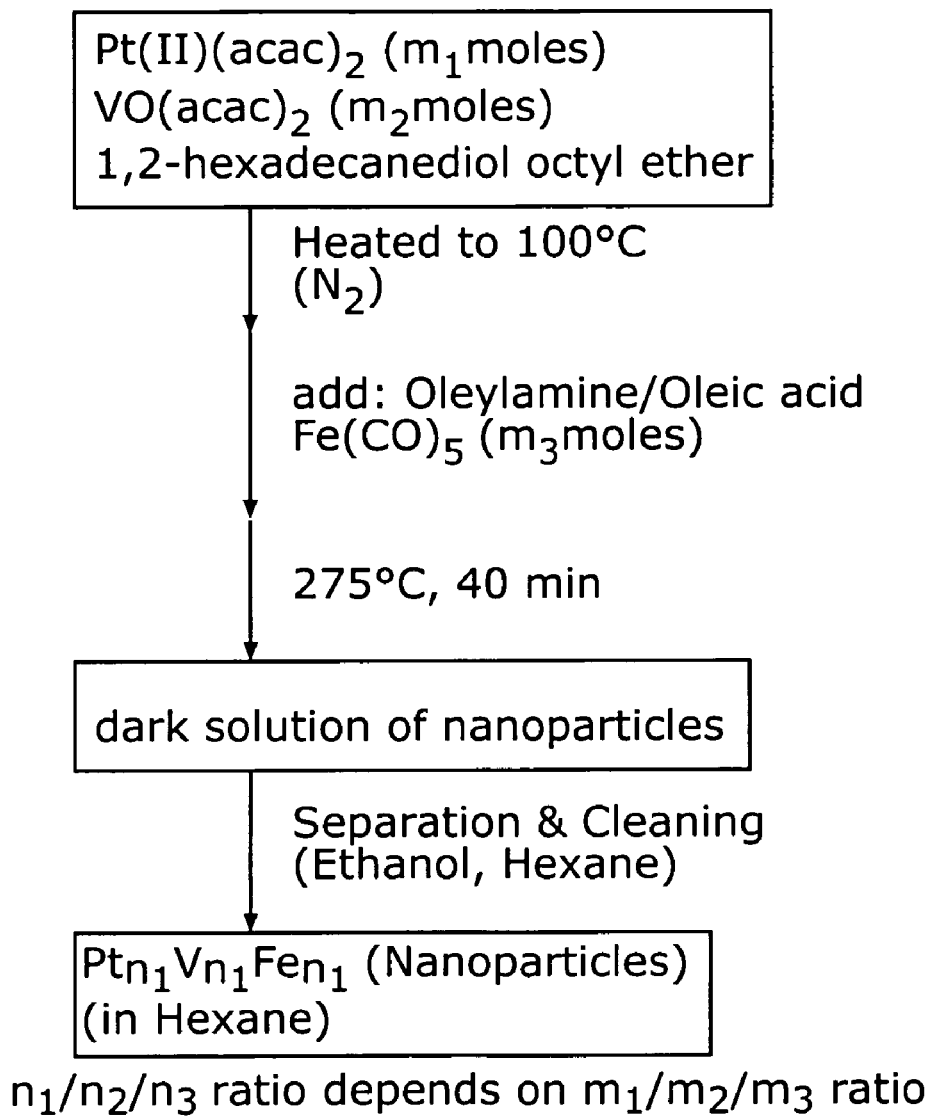
FIG. 3 is a flow chart illustrating the general synthesis of core-shell PtVFe nanoparticles.

Referring now to FIG. 3, there is shown a schematic flow diagram 300 of the general synthesis process using the precursors of FIG. 2. $Pt(II) (acac)_2$ ($m_1$ moles), $VO(acac)_2$ ($m_2$ moles), and 1,2-hexadecanediol in octyl ether, block 302, are heated to approximately 100° C. in a nitrogen atmosphere, step 304. Controlled moles of oleylamine and Oleic acid and $m_3$ moles of $Fe(CO)_5$ are then added, step 306. The mixture is then heated to approximately 275° C. for approximately 40 minutes, step 306. During substantially the whole process, the solution is stirred. The result is a dark solution of nanoparticles, block 308. A separation and cleaning process, typically utilizing ethanol and/or hexane is then performed, step 310. The results of the cleaning and separating process, block 310, is $Pt_{n1}V_{n2}Fe_{n3}$ nanoparticles in hexane, step 312, where the nanoparticle's stoichimetric numbers $n_1$, $n_2$ and $n_3$ are controlled by the quantities of the synthetic feeding $m_1$, $m_2$, and $m_3$.

The composition can be controlled by the synthetic feed ratio. A set of Direct Current Plasma Atomic Emission Spectrometry (DCP-AES) data for a series of PtVFe samples is shown in Table 1. The Table 1 data compares the relative compositions between the synthetic feed ratios and the product composition of the series of PtVFe samples.

TABLE 1

DCP-AES and TEM analytical data for the ternary PtVFe nanoparticles synthesized at different synthetic feed ratios.

| Feed ratio | Product Composition | Particle avg. size |
|---|---|---|
| $Pt_{10}V_{41}Fe_{49}$ | $Pt_{17}V_{10}Fe_{53}$ | 2.4 ± 0.7 nm |
| $Pt_{10}V_{42}Fe_{43}$ | $Pt_{22}V_{35}Fe_{43}$ | 2.5 ± 1.1 nm |
| $Pt_{12}V_{53}Fe_{35}$ | $Pt_{29}V_{35}Fe_{36}$ | 2.0 ± 0.9 nm |
| $Pt_{10}V_{54}Fe_{36}$ | $Pt_{25}V_{35}Fe_{40}$ | 3.1 ± 0.8 nm |
| $Pt_{23}V_{25}Fe_{52}$ | $Pt_{33}V_{21}Fe_{46}$ | 2.3 ± 0.9 nm |
| $Pt_{26}V_{14}Fe_{60}$ | $Pt_{37}V_{16}Fe_{47}$ | 1.4 ± 0.6 nm |

Figure 4:
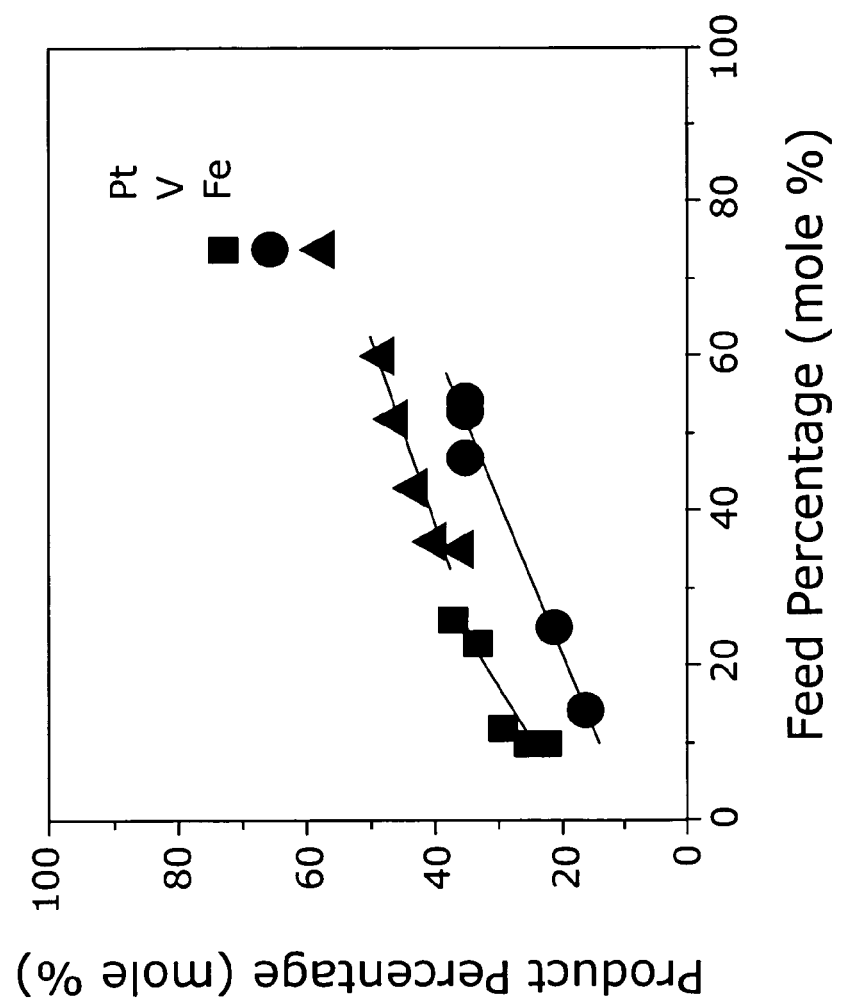
FIG. 4 is a plot of relative compositions in the nanoparticle products vs. those in the synthetic reaction solution.

The relative compositions in the nanoparticle samples are plotted against those in the synthetic reaction solution (FIG. 4). It is clear that the composition of the alloy components in the nanoparticles can be controlled by the feed ratio of the three metals in the synthetic reaction solution. The relationship between the actual composition and the feed ratio of each element obeys the following empirical linear regression laws:

Pt: $Y = 17.3 + 0.73 \times X$ ($R^2 = 0.88$);

V: $Y = 8.9 + 0.50 \times X$ ($R^2 = 0.98$); and

Fe: $Y = 23.5 + 0.42 \times X$ ($R^2 = 0.90$)

Where: X stands for the metal percentage in the synthetic solution, whereas Y stands for the metal percentage in the nanoparticle product. The close linearity shown above is important because it demonstrates that the control of the composition can be easily achieved by controlling the feed ratio.

Figure 5A:
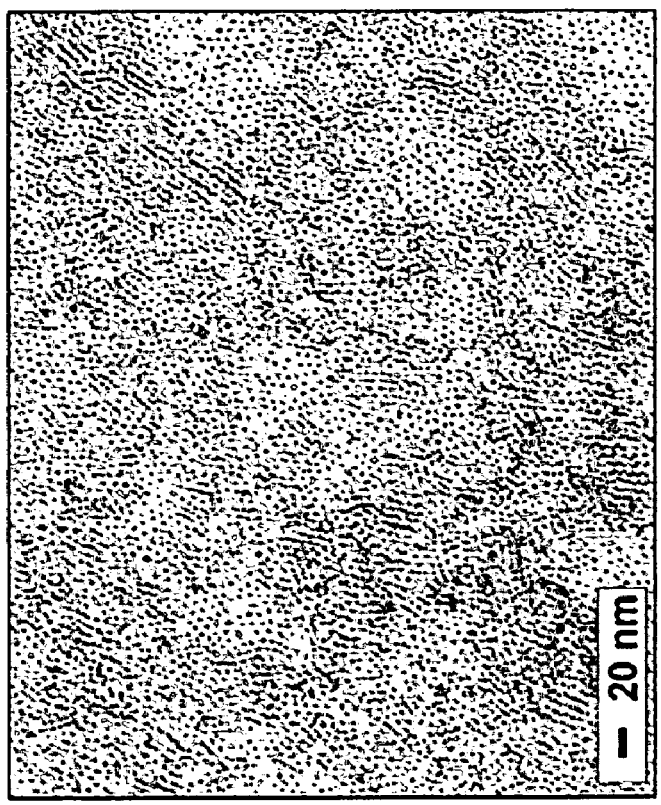
FIG. 5a is a TEM micrograph of the ternary PtVFe ($Pt_{19}Fe_{26}V_{55}$) nanoparticles.
Figure 5B:
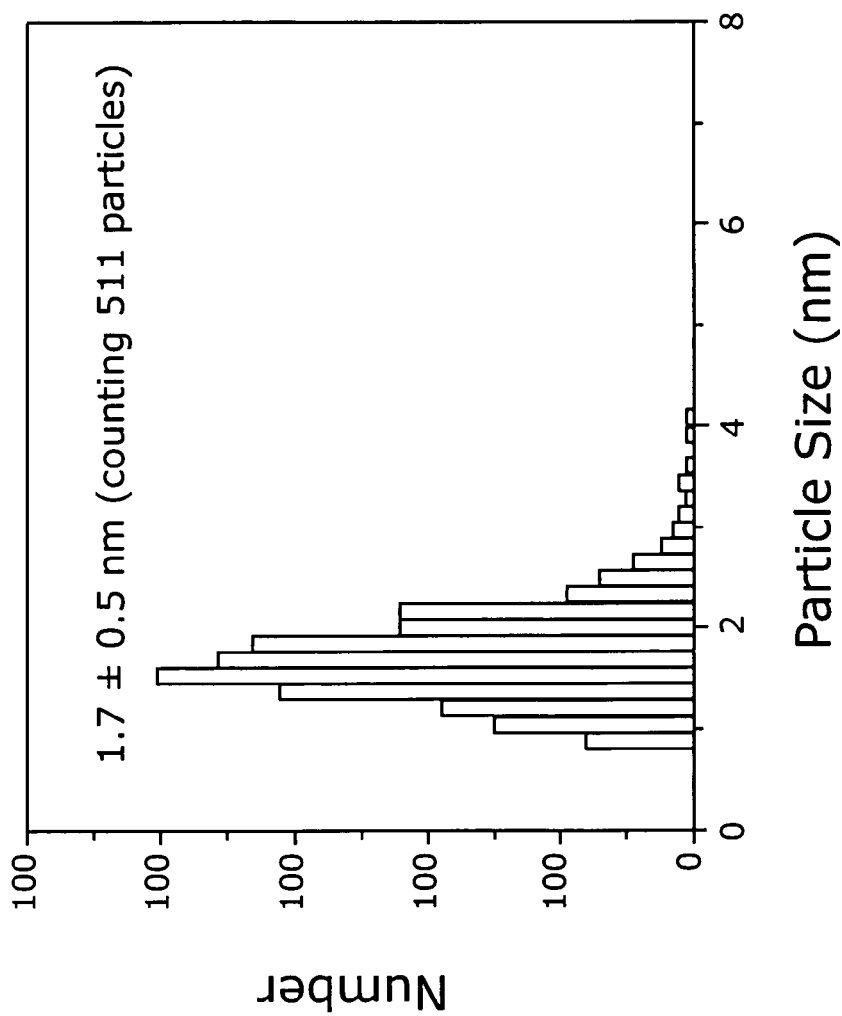

Referring now to FIGS. 5a and 5b, they are a Transmission Electron Microscope (TEM) micrograph of these nanoparticles, and a histogram of particle sizes, respectively. For nanoparticles of different compositions produced from the different synthetic conditions, the particle size showed a slight variation. Typically, the average particle size can be controlled to 2.3±0.8 nm.

Further manipulation of the precursors or reagents is also possible. For example, three synthesis protocols were developed, which differ in terms of the reagents being used in the synthesis. These are:

Protocol I: synthesis using platinum acetylacetonate Pt(acac)$_2$, vanadyl acetylacetonate VO(acac)$_2$, and iron pentacarbonyl Fe(CO)$_5$;

Protocol II: synthesis using Pt(acac)$_2$, V(acac)$_3$ and Fe(CO)$_5$; and

Protocol III: synthesis using Pt(acac)$_2$, V(acac)$_3$ and Fe(acac)$_2$.

Some examples of the nanoparticles synthesized by the three protocols are listed in Table 2.

TABLE 2

DCP-AES analytical data for the ternary PtVFe nanoparticles synthesized at identical synthetic feed ratios.

| Synthesis Protocol | Feed ratio | Product Composition | Particle avg. size |
|---|---|---|---|
| I | Pt$_{26}$V$_{14}$Fe$_{60}$ | Pt$_{33}$V$_{14}$Fe$_{53}$ | 1.7 ± 0.6 nm |
| I | Pt$_{26}$V$_{14}$Fe$_{60}$ | Pt$_{32}$V$_{14}$Fe$_{54}$ | 1.9 ± 0.5 nm |
| I | Pt$_{26}$V$_{14}$Fe$_{60}$ | Pt$_{33}$V$_{14}$Fe$_{54}$ | 1.9 ± 0.3 nm |
| II | Pt$_{26}$V$_{14}$Fe$_{60}$ | Pt$_{32}$V$_{12}$Fe$_{55}$ | 1.9 ± 0.3 nm |
| III | Pt$_{26}$V$_{14}$Fe$_{60}$ | Pt$_{27}$V$_{11}$Fe$_{62}$ | 1.9 ± 0.5 nm |

The particles from protocols I and II are similar in terms of alloy composition and particle size. This suggests that the reduction reactions of VO(acac)$_2$ and V(acac)$_3$ are very similar. For protocol III, the particle sizes are still comparable to protocols I and II, but the relative composition of Pt and V is slightly lower than those from protocols I and II. This is assumed to be due to a lower efficiency in conversion for the reduction of Fe(acac)$_2$, in comparison with the efficiency in the thermal decomposition reaction of Fe(CO)$_5$. In general, it is believed that the three protocols can effectively produce the desired nanoparticle sizes and compositions according to the synthetic parameters including concentrations and feed ratios.

Assembly of Nanoparticles on Carbon Support

Figure 6:
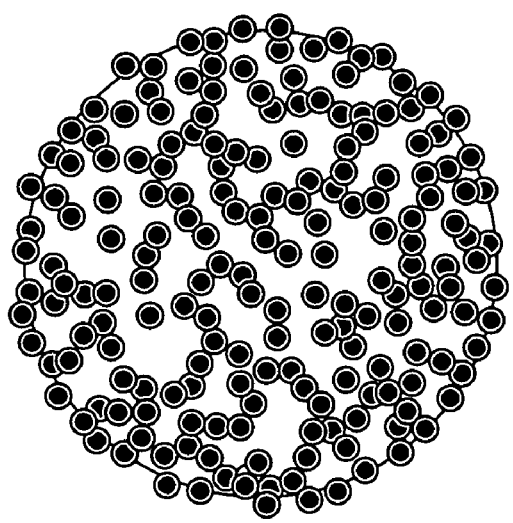
FIG. 6 is a pictorial schematic illustration of the general approach to the nanoparticle assembly on carbon particles.
Figure 6:
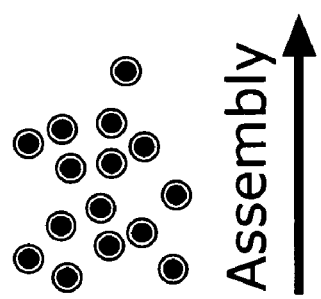
Figure 6:
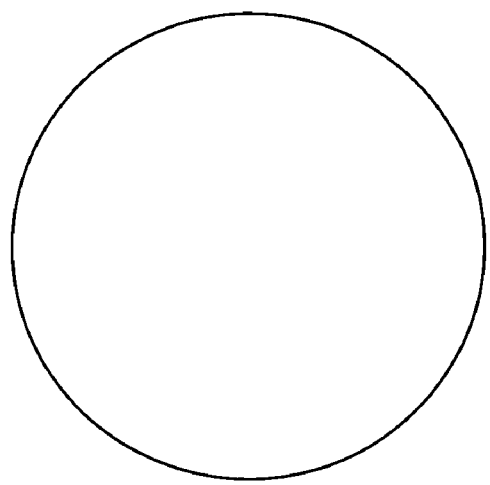

Referring now to FIG. 6, there is shown an illustration of the preparation of carbon-supported nanoparticles. Both ligand-mediated (e.g., hydrogen-bonding and thiolate-binding) and hydrophobicity-mediated (ligand-free) interactions have been used to assemble the nanoparticles on carbon support, Vulcan XC-72R manufactured by Cabot Corporation, Billerica, Mass., and Carbon EC-P manufactured by Ketjen Black International Company, Tokyo, Japan. The detailed preparation procedure required a number of steps. First, as a pre-treatment, 130 mg of carbon black was suspended in 300 mL hexane, and sonicated using a Branson Model 8200 sonicator for approximately 20 hours. Pre-treatment may be performed at a temperature ranging between room temperature (R.T.) and approximately 50° C. Next, the PtVFe nanoparticles were assembled onto the carbon materials. This was performed by adding 28 mL PtVFe (PVFR120702, approximately 70 mg Pt$_2$, V$_{25}$ Fe$_{48}$) to the suspension. In another approach, 9 mL 5 mM 11-mercaptoundecanoic acid (MUA) was added to the suspension. The suspension was then sonicated for approximately 10 hours at a temperature in the range of approximately 0° C.<T<room temperature. Next, sonication was followed by stirring for approximately 20 hours at room temperature using a Corning Model PC-410 magnetic stirrer. The suspension was then kept at room temperature for approximately 24 hours to allow for precipitation. Finally, the solvent was removed by nitrogen-flow assisted evaporation under stirring. The nanoparticle product was then collected.

Table 3 provides a comparison of the mass percentages between the mixed suspensions of nanoparticles and carbon and the C-loaded nanoparticle product.

TABLE 3

An evaluation of the mass loading of the PtVFe nanoparticles on the carbon support

| Mass % of nanoparticles in mixed solution | Mass % of nanoparticles in C-supported product |
|---|---|
| 40% (±10%) | 36% (±10%) |

Figure 7:
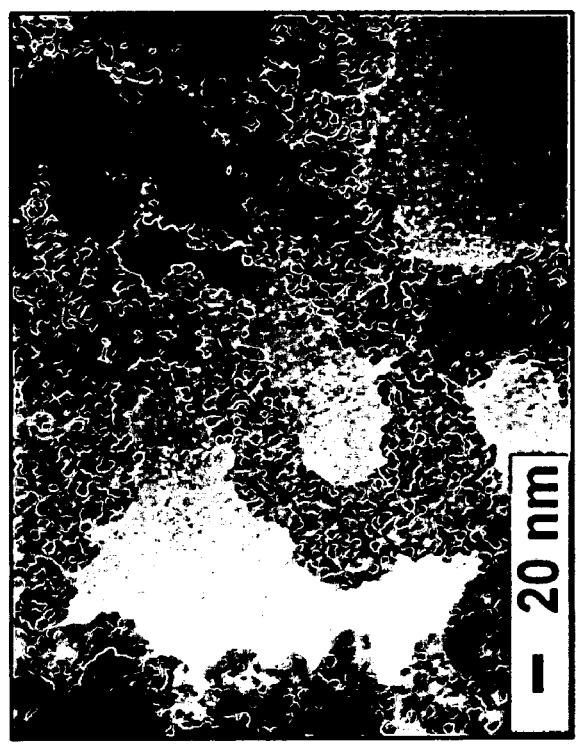
FIG. 7 is a TEM micrograph of ternary PtVFe nanoparticles assembled on carbon black.

By controlling the relative ratio of nanoparticles vs. the carbon black, mass loading may be precisely controlled. Referring now to FIG. 7, there is shown TEM micrographs of the ternary PtVFe nanoparticles assembled on the Ketjen black, respectively. The assembled nanoparticles are individually isolated and uniformly distributed on the carbon particle surface.

Thermal Treatment of C-loaded PtVFe Nanoparticles

Figure 8:
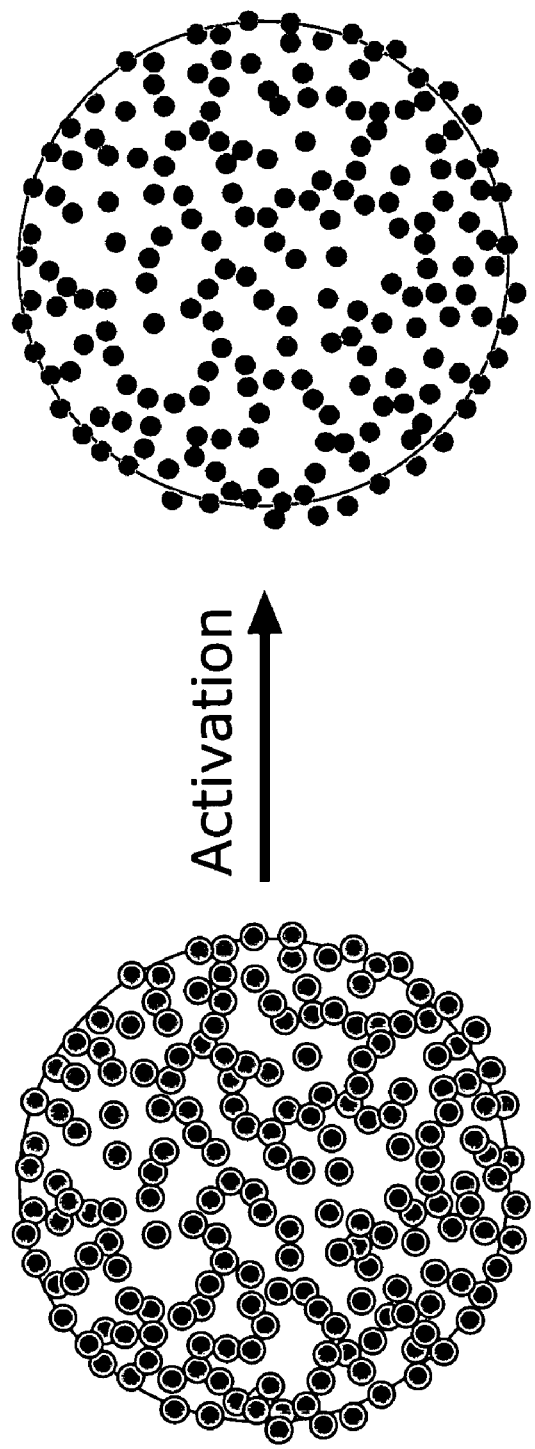
FIG. 8 is a schematic pictorial diagram that illustrates one approach to activating the carbon-supported nanoparticles.

Referring now to FIG. 8, there is shown a schematic pictorial diagram that illustrates one approach to activating the carbon-supported nanoparticles. This illustrated approach uses thermal activation to treat the nanoparticles supported on carbon particle materials and includes alloy sintering, removal of capping agents, and control of particle size. The purpose of the activation process is two-fold: first, the original encapsulation must be removed; second, the solid solution of alloy nanoparticle must be formed. A general procedure for forming the solid solution of alloy nanoparticles involves the following steps: First, heating the solution to approximately 400° C. in a nitrogen environment to remove the solvent. Next, the solution is held at approximately 300° C. in controlled oxygen atmosphere to remove shell materials. Finally, the material is treated at a temperature of between approximately 350 and 650° C. in a controlled hydrogen and oxygen atmospheres for calcination.

All samples were thermally treated in a tube furnace, not shown, using a quartz tube. A typical protocol was first to heat the sample to approximately 400° C. in nitrogen (N$_2$) to remove the solvent. The time required is generally between approximately 15 and 60 minutes. Next, the samples are held at approximately 300° C. in and atmosphere consisting of approximately 5 to 25% O$_2$, the balance of the atmosphere being N$_2$, for approximately 15 to 120 minutes. This removes any shell materials. Finally, the samples are held at a temperature in the range of approximately 350–650° C. in an atmosphere of approximately 5 to 20% H$_2$, the balance of the atmosphere being N$_2$, for approximately 15 to 120 minutes for calcination. Calcination is a process of treatment that involves the control of temperature, time, and environment during thermal treatment to remove organics, to form desired compound and phase composition, and to achieve optimum strength and porosity for optimum catalytic activity. The particle size changes are summarized in Table 4.

TABLE 4

Summary of thermal treatment of a PtVFe sample.
Example: $Pt_{29}V_{35}Fe_{36}$

| Core-shell Nanoparticles | After assembly | After 250° C. in 8% $O_2$, 30 min | After 400° C. in 7% $H_2$, 30 min | After 450° C. in 7% $H_2$, 30 min |
|---|---|---|---|---|
| 2.0 ± 0.9 nm | 2.3 ± 0.4 nm | | 2.7 ± 0.4 nm | 2.9 ± 0.4 nm |

Figure 9A:
FIG. 9a is a representative TEM for thermally-treated carbon-supported PtVFe nanoparticles.
Figure 9B:
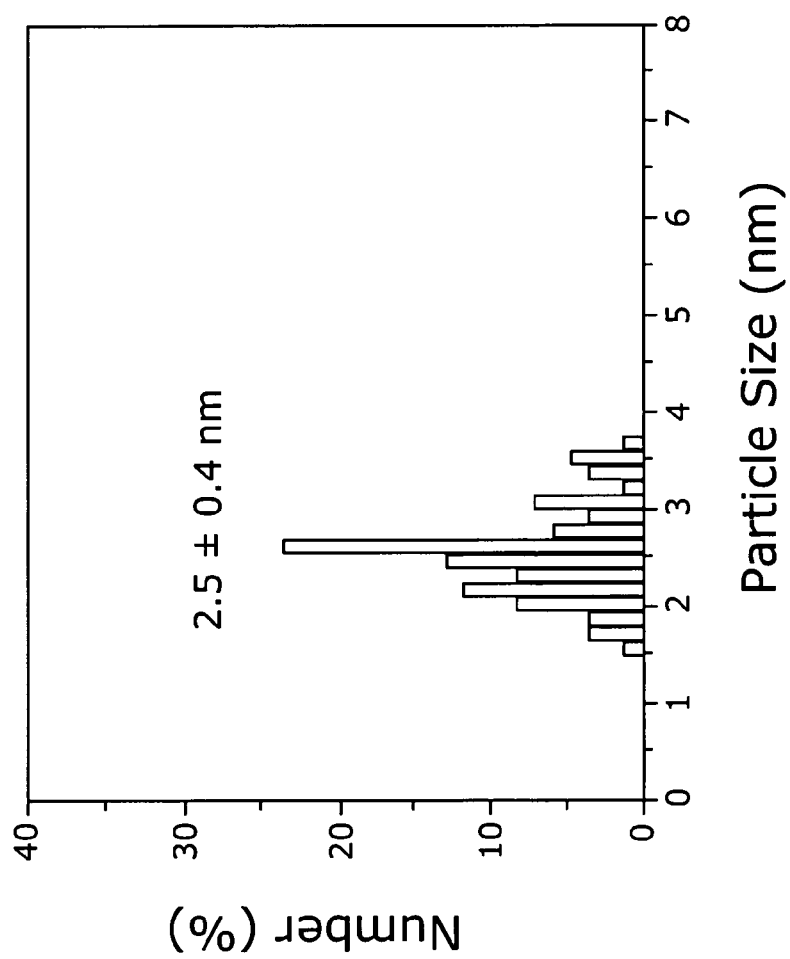

Referring now to FIGS. 9a and 9b, there are shown a representative TEM micrograph and a histogram of a particle size distribution, respectively, for the thermally-treated carbon-supported PtVFe nanoparticles.

The thermally treated nanoparticles may also be characterized by other techniques. Based on Fourier Transform Infrared Spectroscopy (FTIR) data, it was concluded that the organic shell consists of a mixture of OAC and OAM, and also that the thermal treatment at temperatures in the range of 250–300° C. in a 20% $O_2$ atmosphere effectively removes the capping shell. The band at approximately 1612 $cm^{-1}$ is likely due to a combination of nitrogen oxide and/or surface oxide species produced in the presence of 0. A further thermal treatment of the sample at approximately 300–350° C. (5–20% $H_2$) removed this band. In addition, there appears to be a subtle dependence on the initial treatment temperature in the presence of $O_2$ for the effective removal of the surface oxide species in the subsequent thermal treatment in the presence of $H_2$. The X-ray Diffraction (XRD) data indicates the presence of either the solid solution or the formation of new alloyed phase. The Thermogravimetric Analysis (TGA) data for this set of carbon-supported nanoparticles after the two different heating treatments indicate that the alloy consists of approximately 35% of the total weight, which is close the calculated loading data (i.e., 37%). The TGA data for this set of nanoparticles before heating treatment indicates that the organic component consists of approximately 50% of the total weight, which is consistent with the theoretically calculated percentages of the organic shell (i.e., 48–50% for 2-nm particles). It may also be seen that the shell can be completely removed at approximately 350° C.

Figure 10:
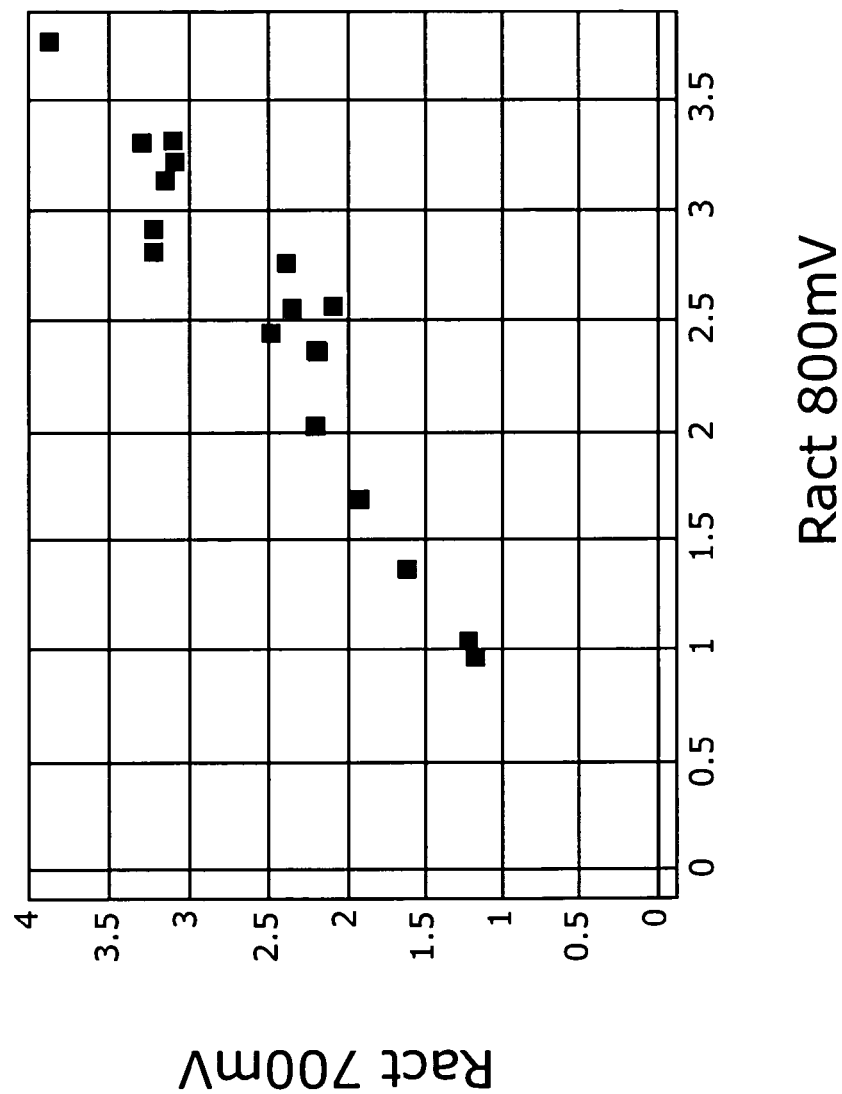
FIG. 10 is a graph comparing the Oxygen Reduction Reaction (ORR) catalytic mass activities of a number of PtVFe/C catalyst samples to a reference Pt/C catalyst.

Oxygen Reduction Reaction (ORR): Catalytic Mass Activity of the Calcinated Carbon-Loaded PtVFe Nanoparticles Referring now to FIG. 10, there is shown a graph of a representative set of Oxygen Reduction Reaction (ORR) activities for a number of catalysts prepared by the inventive method of the present invention. The electrocatalytic mass activity of the nanoparticle catalysts for ORR were characterized using a rotating disk/ring-disk electrode method. The catalytic activity is compared with a standard Pt/C catalyst, the catalytic activity thereof being defined as 1. It may be seen that most of the catalyst samples exhibit higher catalytic activity in the range of approximately 1 to 4 times that of the reference Pt/C catalyst depending on the compositions as well as treatment procedures.

Figure 11:
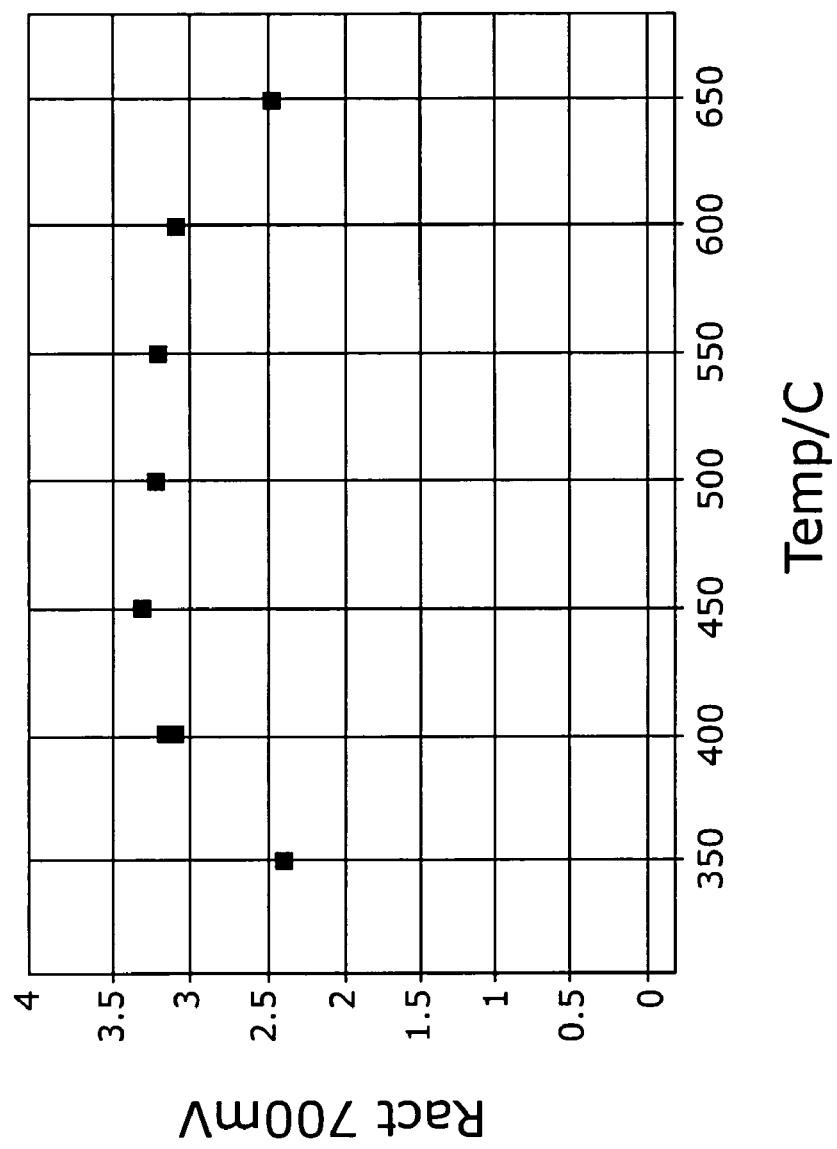
FIG. 11 is a graph comparing the ORR catalytic mass activities of a number of PtVFe/C catalyst samples processed at different calcination temperatures.

Referring now to FIG. 11, there is shown a graph of the ORR activities of a representative set for catalysts processed at different calcinations temperatures. It appears that a calcination temperature in the range of approximately 400–600° C. yields catalysts providing the highest ORR activity.

CONCLUSIONS

Several conclusions may be drawn from the measurements of catalyst samples formed in accordance with the present invention. First, the new ternary PtVFe metal nanoparticle catalysts have been produced. Second, using the inventive approach, core-shell PtVFe nanoparticles with controllable alloy compositions have been prepared by controlling the synthetic feed ratios. Third, the nanoparticle core size can be controlled to approximately 2 nm with high size monodispersity. Fourth, the nanoparticles formed in accordance with the present invention may be assembled on carbon materials with controllable size, composition, loading, and distribution. Fifth, the carbon-loaded PtVFe nanoparticles can be effectively activated and calcinated by thermal treatments at 300–600° C. with controllable sizes and compositions under a number of well-defined conditions. Sixth, the ORR catalytic activities of the PtVFe/C nanoparticles have been shown to increase by factors of 2–4 over ORR catalytic activities of pure Pt/C nanoparticle catalysts.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for forming core-shell PtVFe nanoparticles, the steps comprising:
    a) providing a synthetic reaction solution having a composition comprising at least one of: precursors, capping materials, and reducing agents,
    b) performing at least one of the steps: thermally decomposing at least one of said precursors, and chemically reducing at least one of said precursors; and
    c) precipitating nanoparticles from said synthetic reaction solution.

2. The method for forming core-shell PtVFe nanoparticles as recited in claim 1, wherein said precursors comprise metals and metallic salts of at least platinum (Pt), vanadium (V), and iron (Fe), and an organic compound comprising at least one of: oleyl amine and oleic acid.

3. The method for forming core-shell PtVFe nanoparticles as recited in claim 2, wherein said metals and metallic salts comprise: $Pt(II)(acac)_2$, $V(V)O(acac)_2$, and $Fe(O)(CO)_5$.

4. The method for forming core-shell PtVFe nanoparticles as recited in claim 1, wherein said reducing agent comprises 1,2-hexadecanediol ($CH_3$—$(CH_2)_{13}$—$CH(-OH)$—$CH_2$—$OH$).

5. The method for forming core-shell PtVFe nanoparticles as recited in claim 1, wherein said nanoparticles comprise alloyed $Pt^0V^0Fe^0$ nanoparticles as nanocrystal cores, and mixed organic monolayer (OAM and OAC) as capping shells.

6. The method for forming core-shell PtVFe nanoparticles as recited in claim 5, wherein said nanometer sized PtVFe nanoparticles have a size in the range of approximately 1.0 and 10.0 nanometers.

7. The method for forming core-shell PtVFe nanoparticles as recited in claim 6, wherein said size of said PtVFe nanoparticles is determined by controlling said composition.

8. A method for assembling nanoparticle PtVFe catalysts, the steps comprising:

a) synthesizing PtVFe nanoparticles in accordance with the method recited in claim 6;
b) assembling said PtVFe nanoparticles onto a carbon support, thereby forming assembled nanoparticles; and
c) thermally treating said assembled nanoparticles.

9. A method for assembling nanoparticle PtVFe catalysts, as recited in claim 8, wherein said assembling step (b) comprises at least one of the sub-steps: pre-treating, particle loading, at least one of sonication, and stirring.

10. The method for forming core-shell PtVFe nanoparticles as recited in claim 5, wherein said nanometer sized PtVFe nanoparticles have a size in the range of approximately 1.0 and 3.0 nanometers.

11. The method for forming core-shell PtVFe nanoparticles as recited in claim 5, wherein said PtVFe nanoparticle size is approximately 2 nm.

12. A method for forming carbon-supported core-shell PtVFe nanoparticle catalysts, the steps comprising:
a) providing a synthetic reaction solution comprising: ((Pt(II)(acac)$_2$, V(V)O(acac)$_2$, and Fe(CO)$_5$ in a ratio, the size of resulting nanoparticles being related to said ratio;
b) thermally decomposing and chemically reducing said precursors in the synthetic reaction solution in the presence of 1,2-hexadecanediol (CH$_3$—(CH$_2$)$_{13}$—CH(—OH)—CH$_2$—OH) as reducing agent;
c) precipitating nanoparticles from said thermally decomposed and reduced precursors in said synthetic reaction solution;
d) assembling said nanoparticles onto a carbon support thereby forming assembled nanoparticles, wherein said assembling step (d) comprises at least one of the sub-steps: pre-treating, particle loading, at least one of sonication, and stirring; and
e) thermally treating said assembled nanoparticles.

13. The method for forming carbon-supported core-shell PtVFe nanoparticle catalysts as recited in claim 12, wherein said nanoparticles comprise alloyed PtVFe nanoparticles.

14. The method for forming carbon-supported core-shell PtVFe nanoparticle catalysts as recited in claim 13, wherein said nanometer sized PtVFe nanoparticles have sizes in the range of approximately 1.0 and 10.0 nanometers.

15. The method for forming carbon-supported core-shell PtVFe nanoparticle catalysts as recited in claim 13, wherein said nanometer sized PtVFe nanoparticles have sizes in the range of approximately 1.0 and 3.0 nanometers.

16. The method for forming carbon-supported core-shell PtVFe nanoparticle catalysts as recited in claim 13, wherein said PtVFe nanoparticle size is approximately 2.0 nm.

17. The method for forming carbon-supported core-shell PtVFe nanoparticle catalysts as recited in claim 13, wherein said nanoparticle catalysts exhibit oxygen reduction reaction (ORR) capability of approximately 2 to 4 times the ORR capability of a reference Pt/carbon catalyst.

18. A method for forming core-supported platinum-containing ternary metal nanoparticles, the steps comprising:
a) providing a synthetic reaction solution having a composition comprising at least one of: precursors, capping materials, and reducing agents;
b) performing at least one of the steps: thermally decomposing at least one of said precursors, and chemically reducing at least one of said precursors; and
c) precipitating nanoparticles from said synthetic reaction solution.

19. The method for forming core-shell platinum-containing ternary metal nanoparticles as recited in claim 18, wherein said precursors comprise metals and metallic salts of platinum (Pt) and an organic compound comprising at least one of: oleyl amine and oleic acid.

20. The method for forming core-shell platinum-containing ternary metal nanoparticles as recited in claim 19, wherein said metals and metallic salts comprise: (Pt(II)(acac)$_2$, V(V)O(acac)$_2$, and Fe(O)(CO)$_5$.

21. The method for forming core-shell platinum-containing ternary metal nanoparticles as recited in claim 18, wherein said reducing agent comprises 1,2-hexadecanediol (CH$_3$—(CH$_2$)$_{13}$—CH(—OH)—CH$_2$—OH).

22. The method for forming core-shell Platinum-containing ternary metal nanoparticles as recited in claim 18, wherein said nanoparticles comprise alloyed Pt0V0Fe0 nanoparticles as nanocrystal cores, and mixed organic monolayer (OAM and OAC) as capping shells.

23. The method for forming core-shell platinum-containing ternary metal nanoparticles as recited in claim 22, wherein said nanometer sized nanoparticles have a size in the range of approximately 1.0 and 10.0 nanometers.

24. The method for forming core-shell platinum-containing ternary metal nanoparticles as recited in claim 23, wherein said size of said nanoparticles is determined by controlling said composition.

25. A method for assembling ternary metal nanoparticle Platinum-containing catalysts, the steps comprising:
a) synthesizing platinum-containing nanoparticles in accordance with the method recited in claim 23;
b) assembling said platinum-containing nanoparticles onto a carbon support, thereby forming assembled nanoparticles; and
c) thermally treating said assembled nanoparticles.

26. A method for assembling ternary metal nanoparticle platinum-containing catalysts, as recited in claim 25, wherein said assembling step (b) comprises at least one of the sub-steps: pre-treating, particle loading, at least one of sonication, and stirring.

27. The method for forming core-shell platinum-containing ternary metal nanoparticles as recited in claim 22, wherein said nanometer sized nanoparticles have a size in the range of approximately 1.0 and 3.0 nanometers.

28. The method for forming core-shell platinum-containing ternary metal nanoparticles as recited in claim 22, wherein said nanoparticle size is approximately 2 nm.

29. A method for forming carbon-supported core-shell Platinum-containing ternary metal nanoparticle catalysts, the steps comprising:
a) providing a synthetic reaction solution comprising Pt(II)(acac)$_2$;
b) thermally decomposing and chemically reducing said precursors in the synthetic reaction solution in the presence of 1,2-hexadecanediol (CH$_3$—(CH$_2$)$_{13}$—CH(—OH)—CH$_2$—OH) as reducing agent;
c) precipitating nanoparticles from said thermally decomposed and reduced precursors in said synthetic reaction solution;
d) assembling said nanoparticles onto a carbon support thereby forming assembled nanoparticles, wherein said assembling step (d) comprises at least one of the sub-steps: pre-treating, particle loading, at least one of sonication, and stirring; and
e) thermally treating said assembled nanoparticles.

30. The method for forming carbon-supported core-shell platinum-containing ternary metal nanoparticle catalysts as recited in claim 29, wherein said nanoparticles comprise alloyed nanoparticles.

31. The method for forming carbon-supported core-shell platinum-containing ternary metal nanoparticle catalysts as recited in claim 30, wherein said nanometer sized nanoparticles have sizes in the range of approximately 1.0 and 10.0 nanometers.

32. The method for forming carbon-supported core-shell platinum-containing ternary metal nanoparticle catalysts as recited in claim 30, wherein said nanometer sized nanoparticles have sizes in the range of approximately 1.0 and 3.0 nanometers.

33. The method for forming carbon-supported core-shell platinum-containing ternary metal nanoparticle catalysts as recited in claim 30, wherein said nanoparticle size is approximately 2.0 nm.

34. The method for forming carbon-supported core-shell platinum-containing ternary metal nanoparticle catalysts as recited in claim 30, wherein said nanoparticle catalysts exhibit oxygen reduction reaction (ORR) capability of approximately 2 to 4 times the ORR capability of a reference Pt/carbon catalyst.

* * * * *